United States Patent
Kusters et al.

[11] 3,729,250
[45] Apr. 24, 1973

[54] ACOUSTO-OPTIC FILTER HAVING MEANS FOR DAMPING ACOUSTIC RESONANCES AND STRAY LIGHT

[75] Inventors: John A. Kusters, San Jose; David A. Wilson; Laurence M. Hubby, Jr., both of Palo Alto, all of Calif.

[73] Assignee: Hewlett-Packard Company, Palo Alto, Calif.

[22] Filed: July 23, 1971

[21] Appl. No.: 165,629

[52] U.S. Cl. ................................. 350/149, 350/161
[51] Int. Cl. ........................................... G02f 1/24
[58] Field of Search .................. 350/149, 150, 157, 350/160, 161

[56] References Cited

UNITED STATES PATENTS

| | | | |
|---|---|---|---|
| 3,572,897 | 3/1971 | Bousky | 350/150 |
| 3,653,743 | 4/1972 | Kiefer et al. | 350/161 |
| 3,632,193 | 1/1972 | Kusters | 350/149 |
| 3,644,015 | 2/1972 | Hearn | 350/161 |
| 3,614,201 | 10/1971 | Biazzo et al. | 350/161 |
| 3,637,288 | 1/1972 | Seidel | 350/149 |
| 2,392,350 | 1/1946 | Willard | 350/161 |

OTHER PUBLICATIONS

Harris et al., "CaMoO Electronically Tunable Optical Filter" App. Phys. Lett. Vol. 17, No. 5 (Sept. 1 1970) pp. 223-225.

*Primary Examiner*—John K. Corbin
*Attorney*—Roland I. Griffin

[57] ABSTRACT

Acoustic resonances in the acoustically excited photoelastic optically birefringent crystal of an acousto-optic filter are damped by coating the side of the photoelastic crystal with an acoustic absorbing medium, such as tungsten powder loaded epoxy, whereby undesired acoustic resonances are damped. The acoustic impedance of the coating preferably matches the acoustic impedance of the crystal. The outside surface of the crystal is preferably cleaned and roughened to assure an intimate bond between the absorbing material and the crystal medium.

2 Claims, 4 Drawing Figures

Patented April 24, 1973
3,729,250
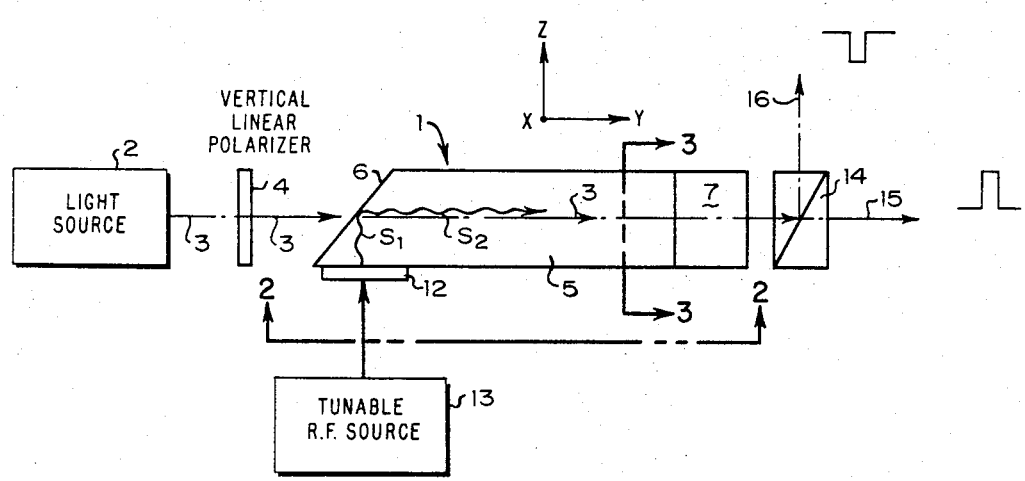
Figure 1
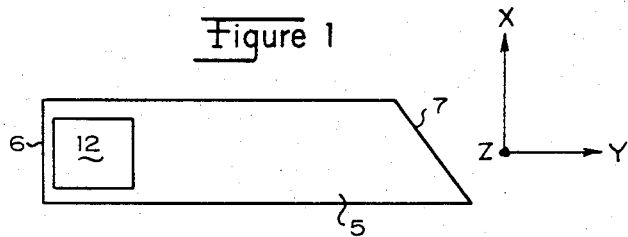
Figure 2
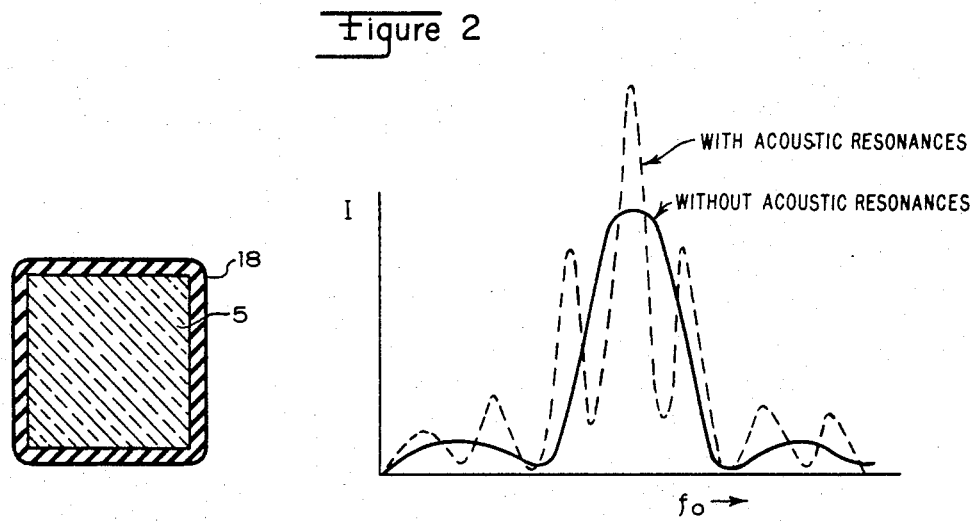
Figure 3
Figure 4
INVENTORS
JOHN A. KUSTERS
DAVID A. WILSON
LAURENCE M. HUBBY, JR.
BY Roland D. Griffen
ATTORNEY

ACOUSTO-OPTIC FILTER HAVING MEANS FOR DAMPING ACOUSTIC RESONANCES AND STRAY LIGHT

DESCRIPTION OF THE PRIOR ART

Heretofore, electronically tunable acousto-optic filters have been constructed wherein light of a first polarization was collinerally diffracted on an acoustic wave in an optically anisotropic medium, such as a photoelastic birefringent crystal, to shift the polarization of the polarized input light beam at a selected bandpass optical frequency from the first polarization to a second orthogonal polarization. The diffracted light was polarization analyzed to separate the light of the second polarization from light of the first polarization. The bandpass of the filter was electronically tunable by varying the frequency of the acoustic wave within the birefringent crystal.

Such an acousto-optic filter is disclosed in an article titled "Acousto-Optic Tunable Filter" appearing in the Journal of the Optical Society of America, Volume 59, No. 6 of June of 1969, pages 744–747, and in an article titled "Electronically Tunable Acousto-Optic Filter" appearing in the Applied Physics Letters, Volume 15, No. 10, of Nov. 15 1969, pages 325 and 326. One of the problems encountered with this prior art acousto-optic filter, which is of the type wherein the light beam is projected through the crystal, is that reflection of acoustic waves from the output end of the crystal back to the input end sets up standing acoustic waves or acoustic resonances within the photoelastic birefringent crystal. These acoustic resonances introduce ripples in the optical bandpass characteristic of the filter, and it is desired to reduce or eliminate these ripples.

SUMMARY OF THE PRESENT INVENTION

The principal object of the present invention is the provision of an acousto-optic filter having means for damping acoustic resonances.

In one feature of the present invention, an acoustic absorbing medium is coupled to the photoelastic optically birefringent crystal for absorbing acoustic wave energy reflected from the output end of the crystal, whereby undesired acoustic resonances are damped.

In another feature of the present invention, the acoustic absorbing medium comprises a coating of acoustic absorbing material on the sides of the photoelastic crystal.

In another feature of the present invention, the acoustic absorbing medium which is coupled to the photoelastic crystal comprises an adhesive loaded with particles of a material having a density which is substantially greater than the density of the adhesive.

In another feature of the present invention, the acoustic absorbing medium coated onto the sides of the photoelastic crystal comprises an epoxy adhesive loaded with particles of tungsten.

In another feature of the present invention, the acoustic absorbing medium coupled to the photoelastic birefringent crystal is made of a material having a product of its density and acoustic velocities approximately equal to the product of the acoustic velocity and density of the photoelastic crystal material to which it is coupled, whereby the acoustic impedance of the acoustic absorbing medium is substantially matched to the acoustic impedance of the crystal to obtain maximum transfer of acoustic energy to the absorbing medium.

Other features and advantages of the present invention will become apparent upon a perusal of the following specification taken in connection with the accompanying drawings.

BRIEF DESCRIPTION OF THE DRAWINGS

FIG. 1 is a schematic line diagram, partly in block diagram form, of an acousto-optic filter incorporating features of the present invention.

FIG. 2 is a side elevational view of a portion of the structure of FIG. 1 taken along line 2—2 in the direction of the arrows.

FIG. 3 is an enlarged sectional view of the structure of FIG. 1 taken along line 3—in the direction of the arrows.

FIG. 4 is a plot of optical beam intensity I versus optical frequency $f_o$ depicting the bandpass characteristics of the acousto-optic filter of FIG. 1 with and without acoustic resonances within the photoelastic birefringent crystal.

DESCRIPTION OF THE PREFERRED EMBODIMENTS

Referring now to FIGS. 1 and 2, there is shown an acousto-optic filter 1 incorporating features of the present invention. Acousto-optic filter 1 is substantially the same as that disclosed in the aforecited Journal of the Optical Society of America. More specifically, the acousto-optic filter 1 includes a light source 2 which projects a beam of light 3 through a vertical linear polarizer 4 into an optically anisotropic photoelasitc medium 5, such as a crystal of $LiNbO_3$, $PbMoO_4$, $CaMoO_4$ or quartz. The beam of light is directed against an input face 6 of the crystal 5 at such an angle that the light beam is diffracted through the crystal 5 parallel with the Y axis thereof between the end faces 6 and 7. The Y axis is not necessarily the crystalline Y axis.

The light source 2 may be of any type. For example, it may be a coherent light source, such as a laser, or it may be a broadband light source having a uniform spectral power density, such as a white light source. The input vertical polarizer 4 serves to pass only that light from the source 2 which is polarized in the vertical direction, i.e., the Z direction, to provide a polarized input light beam 3. The input light beam enters input face 6 of the crystal 5 and travels generally along the longitudinal axis (Y axis) of the crystal 5 and passes out the opposite end face 7 of the crystal 5 as an output beam 3.

For a particular combination of light wave and acoustic wave frequencies, there is found to be a strong interaction between the light wave and the acoustic wave in which the acoustic wave diffracts a portion of the light wave from the polarization orientation of the input beam 3 into an orthogonal polarization. This yields a narrow band of light of orthogonal polarization which is separated from the output beam 3 by means of a polarization analyzer 14, such as a Rochon or Glan-Taylor prism.

Polarization analyzer 14 is oriented to pass that portion of the output beam 3 having a cross-polarization to the polarization of the input polarizer 4, namely, in the horizontal direction, as output beam 15. Output beam 15 then comprises a bandpass output characteristic. That portion of the light of the output light beam 3 which has the same polarization as the input beam is reflected as a second output beam 16 via the polarization analyzing prism 14. Output beam 16 comprises all the input vertically polarized light minus that portion or notch of the light which has been converted from the vertical polarization to the horizontal polarization. Thus, output beam 16 has a band reject or notch band characteristic.

That light which is diffracted from the input polarization to the crossed or orthogonal polarization has an optical frequency related to the frequency of the acoustic wave $f_a$ by the following relation:

$$f_o = c f_a / V |\Delta n|$$

where $c/V$ is the ratio of the light velocity in vacuum to the acoustic velocity in the medium, and $|\Delta n|$ is the birefringence of the crystal 5.

In a typical example employing a lithium niobate crystal 5, the acousto-optic filter 1 is tunable from 7,000 to 5,500 A by changing the acoustic drive frequency from 750 to 1,050 MHz. A passband of less than 2 A is obtained for output beam 15 when a crystal 5 centimeters long is employed.

In the prior art, the photoelastic birefringent crystal 5 had its input face 6 and output face 7 cut such that the normals to the cut faces both lie in the Y-Z plane of the crystal and such that the acoustic wave energy $S_2$ reaching the output face 7 was reflected toward the side walls of the crystal to minimize the possibility of setting up unwanted acoustic resonances within the crystal. However, it has been found that such acoustic resonances are not entirely eliminated in this manner.

Accordingly, in the present invention, an acoustic absorbing medium is coupled to the sides of the crystal 5, as by coating the crystal 5 with an acoustic absorbing material 18 (see FIG. 3). The acoustic absorbing material 18 preferably is bonded or coupled to the crystal 5 via an intimate bond to assure sufficient coupling between the coating 18 and the crystal 5. In addition, the coating 18 preferably has an acoustic impedance approximately equal to the acoustic impedance of the crystal 5 such that maximum transfer of acoustic power is obtained from the crystal to the acoustic absorbing layer 18. More particularly, the product of density and acoustic velocity in the crystal 5 should be approximately equal to the product of density and acoustic velocity in the coating 18.

In addition, the end faces 6 and 7 of the crystal 5 are preferably cut with the normals to the faces lying in orthogonal planes such as the $z-y$ plane and $x-y$ plane, respectively, to reflect acoustic waves in orthogonal planes. Moreover, the output face 7 is preferably cut at Brewster's angle to the Y axis to minimize reflection of the optical beam 3.

In a typical example, the acoustic absorbing coating 18 comprises a relatively low viscosity acoustically lossy epoxy adhesive, i.e., a viscosity between 100 and 500 cp. Such an epoxy is marketed by Epoxy Technology, Inc. of Watertown, Mass. as Epo-Tek 305. This epoxy adhesive is loaded in approximately equal volume portions with a relatively high density material such as tungsten powder. The powder is less than 2 mils in diameter and preferably in the micron size range. The loaded epoxy is coated onto the cleaned and roughened translucent or diffusely reflecting side surfaces of the crystal 5 to assure an intimate bond between the adhesive and the crystal. The acoustic absorbing coating 18 is coated to a thickness of approximately 0.5 millimeter.

Another advantage of using tungsten powder as the acoustic loading material 18 is that tungsten powder absorbs light. In any real acousto-optic filter of this type there is always stray light present which results from scatter at the various surfaces of the input polarizer, input prism, and input end of the birefringent medium, either due to imperfect surface quality or imperfect coatings, or both. This stray light is, in general, depolarized and scattered most strongly in the forward directions. Such light will, if directed through the output pupil of the acousto-optic filter, degrade the overall signal-to-noise ratio of the device and hence is undesirable. Heretofore, in acousto optic filters much of this stray light was indeed directed through the output pupil of the device by reflection and/or diffuse scattering at the side walls of the birefringent medium. The method of the present invention overcomes this problem to a large extent because a transparent epoxy cement can be used as a carrier which has an index of refraction much closer than that of air to that of the birefringent medium, causing a substantial amount of the stray light which strikes the side walls of the birefringent medium and would thus normally be reflected and/or rescattered to be coupled out of the birefringent medium and absorbed by the tungsten powder.

We claim:

1. An acousto-optic filter comprising a photoelastic birefringent crystal, means for directing a polarized beam of light through said photoelastic birefringent crystal, means for directing an acoustic wave collinearly with the polarized beam of light through said photoelastic birefringent crystal to shift a portion of the polarized beam of light from a first polarization to an orthogonal second polarization, and a single coating comprising a mixture of acoustic and light energy absorbing material on the sides of said photoelastic birefringent crystal to damp undesired acoustic resonances and stray light.

2. An acousto-optic filter as in claim 1 wherein said coating of acoustic and light energy absorbing material comprises an epoxy adhesive loaded with particles of tungsten.

* * * * *